Figure 1:
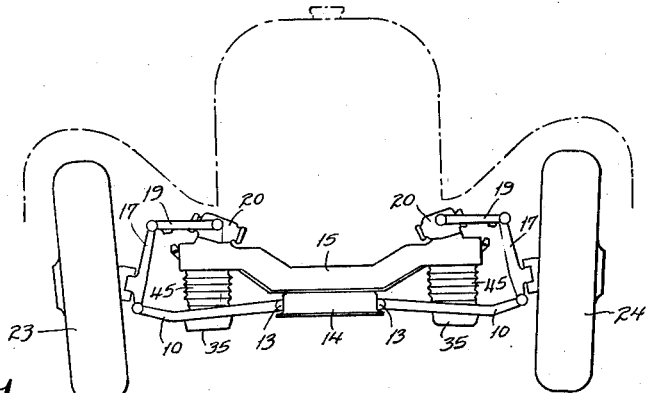

June 23, 1936.　　　T. H. THOMPSON　　　2,045,031
SHROUDED HELICAL SPRING MOUNTING FOR AUTOMOBILES
Filed Dec. 28, 1933　　　2 Sheets-Sheet 1

Inventor
Tom H. Thompson
By Bates, Goldrick & Teare
Attorney

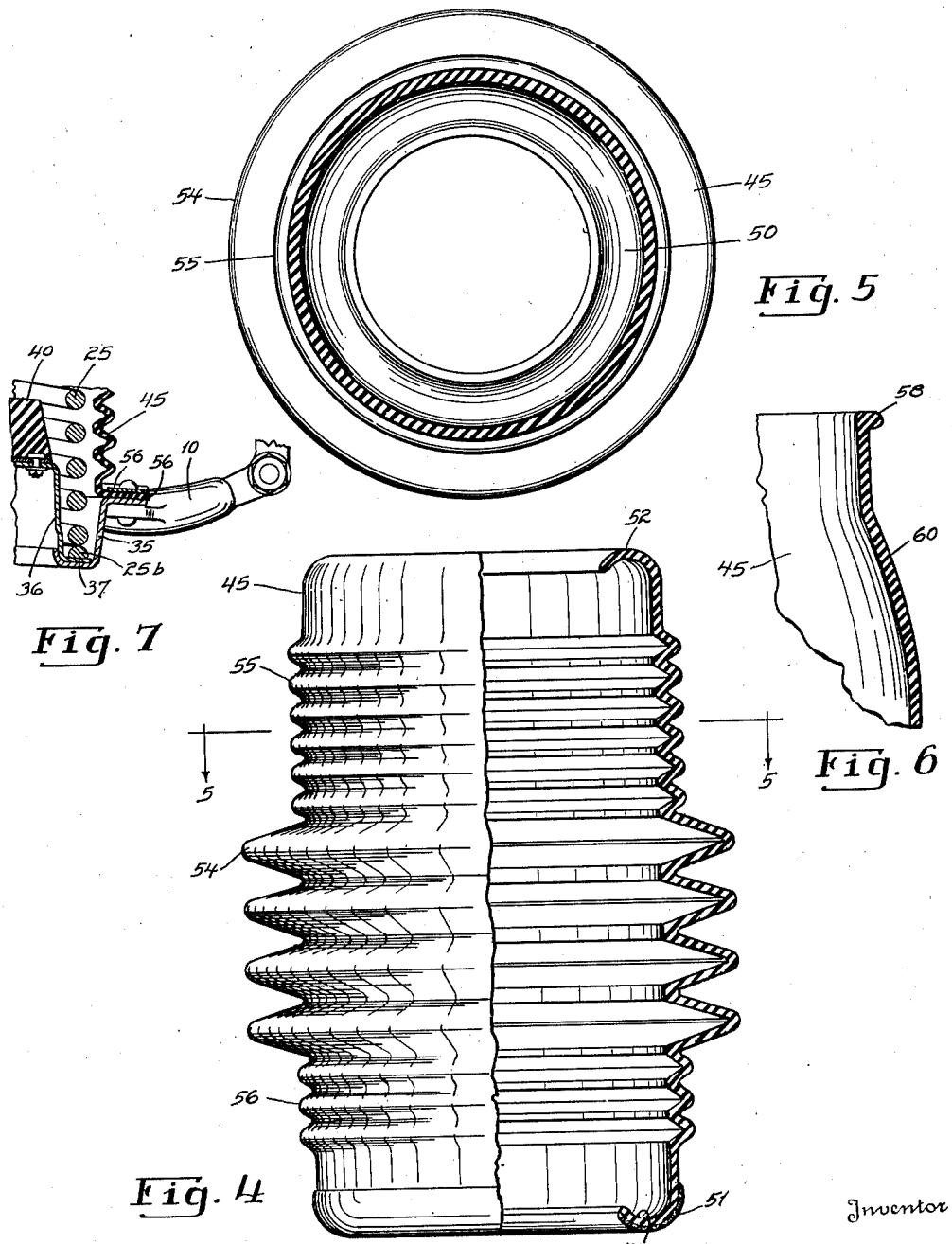

Patented June 23, 1936

2,045,031

UNITED STATES PATENT OFFICE 2,045,031

SHROUDED HELICAL SPRING MOUNTING FOR AUTOMOBILES

Tom H. Thompson, Detroit, Mich.

Application December 28, 1933, Serial No. 704,338

10 Claims. (Cl. 267—20)

This invention is directed to improvements in spring mountings for automobiles and particularly vehicles embodying helical spring mountings, and the general object thereof is the provision of a novel combination of elements which, under all weather and driving conditions, will assure an efficient functioning of the springs.

The present development in automobile constructions has led to the abandonment of the well-known leaf type spring suspension between the vehicle axles and the chassis of the vehicle, and the substitution therefor of wheel mountings involving the use of helical springs, whereby more individual movement of the wheels under varying road conditions may be obtained. Various designs of such spring mountings usually involve the use of a lever, which is attached, at one end, in a pivotal manner to the chassis construction of the vehicle and at the other or free end thereof to the steering knuckles upon which the wheels are mounted, and the springs are interposed between said levers and the underside of the chassis, this general arrangement being characteristic of the front wheel mountings of an automobile of modern design.

The helical springs thus mounted are in an exposed position and subject to an accumulation of dirt and grit and the seats thereof to the accumulation of foreign matter, which eventually will interfere with the proper functioning of the springs and after a period of time could result in a rupturing of the spring coils.

A further object of my invention therefor is the provision of a spring arrangement which will afford protection for the helical spring without in any way interfering with the expansion and contraction thereof.

A still further object of my invention is the provision of a shroud or cover for a helical spring, which can be placed in combination with the spring mounting and its associated mechanism in such manner as to be highly efficient in the prevention of the ingress of foreign matter to the spring environment proper and which, while thus placed, will not be injured nor destroyed by the action of the spring and associated mechanism, under deflecting and expanding conditions.

A still further object of my invention is the provision of a helical spring cover, provided with a special wall construction which will serve to maintain said wall out of immediate contact with the spring, while the latter is rapidly expanding and contracting.

Other objects of my invention will become apparent from a description of an embodiment of my invention illustrated in the drawings, and the essential characteristics thereof are summarized in the claims.

Figure 2:
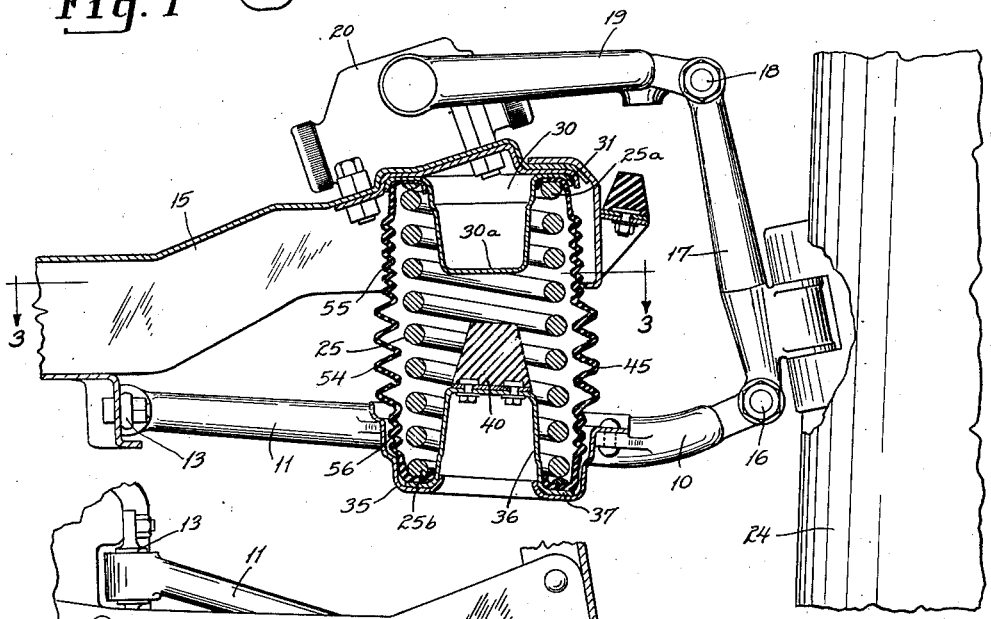
Figure 3:
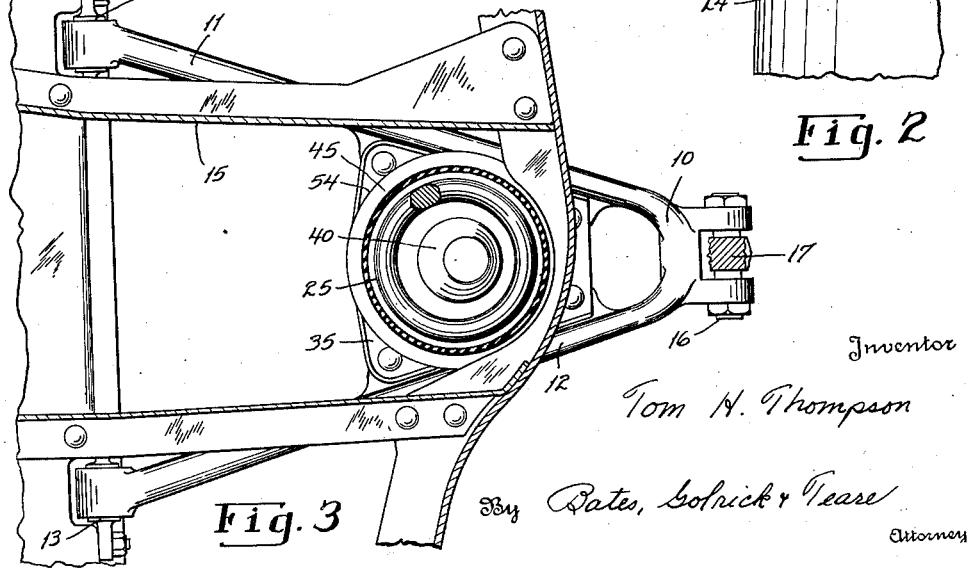

In the drawings, Fig. 1 is a front elevation of an automobile chassis showing spring mountings and wheels embodying the helical spring suspension and incorporating my invention; Fig. 2 is an enlarged cross-sectional elevation of the helical spring mounting, associated mechanism and chassis; Fig. 3 is a top cross-sectional plan view, taken through the spring mounting construction substantially along the line 3—3 of Fig. 2; Fig. 4 is an elevational view, showing in partial cross-section a spring shroud or covering construction embodying some of the features of my invention; Fig. 5 is a cross-sectional view taken substantially along the line 5—5 of Fig. 4, and Fig. 6 is a fragmentary cross-sectional view of a modified form of my spring cover construction; Fig. 7 shows a further modification thereof.

Referring to the drawings, in Figs. 1 and 2 I show one form of helical spring suspension for automotive vehicles, in which my invention can be conveniently incorporated, and such a suspension comprises wish-boned shaped lever members 10, having legs 11 and 12 thereof pivotally connected at 13 to a depending chassis member 14, attached to the front chassis cross construction 15. The outer free end of the lever member 10 is pivotally connected at 16 to the steering knuckle 17 of the vehicle, and the steering knuckle 17 is pivotally connected at 18 to an arm 19 of a shock absorber mechanism generally indicated at 20. The shock absorber mechanism is shown as being secured to the upper side of the chassis construction. Front wheels 23 and 24 are dirigibly connected in a well-known manner to the steering knuckles 17. Interposed between the lever member 10 and the chassis construction 15 is a helical spring member 25.

To maintain the spring in cooperative relation to the underside of the chassis construction 15 and the lever member 10, annularly formed means or seats are provided comprising a cup-shaped member 30, having an annular flange 31, which reacts against the underside of the chassis construction and affords a seat for the first or top turn 25a of the helical spring 25. The member 30 serves as a stop for the swinging movement of the lever member 10 in a manner to be hereinafter described.

To maintain the lower end of the spring member 25 upon the lever member 10, a depending annular member 35 is provided (see Fig. 2) on the lever member 10, between the legs 11 and 12 thereof, which serves as a support for the cup-shaped member 36. The cup-shaped member 36 is provided with an annular flange 37, comprising a seat for the lower coil 25b of the spring. The cup-shaped member 36 is provided with a rubber bumper 40, which, when the maximum movement between the chassis construction 15 and the lever member 10 takes place, serves to react against the wall 30a of the cup-shaped member 30.

To prevent the accumulation of stones and other foreign matter in the spring seat construction afforded by the members 35 and 36, I provide a casing shown in elevation in Figs. 2 and 4, which may comprise rubber or a rubberized fabric or other suitable flexible material which has been constructed in such a manner that the casing may be readily placed upon the spring member 25 before the same is assembled in cooperative relation with the chassis 15 and the lever member 10, and this casing is constructed in such a manner as to maintain the walls thereof out of contact with the coils of the spring 25 during operation of the vehicle and particularly during any relative flexing movement which takes place between the lever 10 and the chassis construction 15. As shown in Fig. 4, the lower end of the casing is provided with an inwardly extending flange 50, upon which the lower coil 25b of the spring 25 may rest, and thus react against the flange 37 of the cup-shaped member 35. If desired, this flange may be provided with a reinforced fabric layer 51. Hence, this lower flange may serve to hold the casing in place relative to the wheel mounting mechanism and the spring. The upper ends of the casing may also be provided with an inwardly extending flange 52 which may or may not be reinforced with the fabric, but I prefer to have the flange 52 an integral part of the side wall, whereby its elasticity will permit of ready application of the casing to the spring.

The side of the tubular wall of the casing is provided with corrugation formations 54 and minor corrugations 55 at the top thereof and 56 near the bottom thereof, which serve in a sort of bellows manner to permit the casing to become elongated or shortened in conformity with the depressing and expanding movements of the spring, while maintaining the inner surface thereof out of contact with the spring coils. It will be noted that the major corrugations 54 are formed on the casing wall at such position as to not contact with either the lever member 10 nor the chassis construction 15, should full deflection or compression of the spring take place. The minor corrugations 55 and 56 serve, to a certain extent, to function in the same manner and also function to permit a certain amount of vibratory movement of the side wall construction of the casing relative to the spring coils. This vibratory movement serves further to prevent the casing wall from being pinched or cut by the spring coils when the same are compressed together.

The casing shown in Fig. 4 is preferably manufactured by molding sheet rubber about a ribbed core or mold by the water cure process. This permits of the use of rubber compounds which will withstand continuous vibration and expansion and contraction under varying weather conditions, concurrently with the contraction and expansion of the spring and the corrugations add stability to the casing, although it is to be understood that the casing could be of a barrel-shaped form, whereby, upon compression of the spring, the annular wall of the casing would bulge outwardly and away from the spring coils. By having the top flange 52 substantially as elastic as the material forming the side wall of the casing, the casing may be placed upon the spring with ease.

In Fig. 6 I show a modified form of the casing structure, in that the top end may be substantially cylindrical and the length of the casing would be greater than the maximum distance between the spring seats, whereby when the casing and spring are placed in assembled relation to the chassis and the spring lever 10, the casing wall would become compressed and thus the inherent expanding qualities of the wall construction would tend to maintain the upper edge 58 of the construction shown in Fig. 6 in contact with the underside of the chassis construction or the upper spring seating means. The side wall 60 is shown as being substantially barrel-shaped throughout part of its length.

Fig. 7 shows a further modification of the invention in that the bottom of the spring cover, instead of extending downwardly inside of the lower spring sheet seat members or cups 35 and 36, can terminate in a flange 55 or other suitable terminal construction, whereby the lower end of the spring cover can be secured exteriorly of the lower spring construction. As shown in Fig. 7 I have indicated a clamping ring 56 secured in any suitable manner to lever member 10 or to a suitable flange as shown on the cup-shaped member 35. While in Fig. 7 I have shown side wall corrugations, nevertheless it will be apparent that the barrel wall construction shown in Fig. 6 can be utilized with the flange 55 or other suitable means formed about the lower perimeter thereof.

The foregoing description of the embodiment of my invention illustrated in the drawings, will be apparent to those skilled in the art, in that I eliminate all dangers of foreign matter from becoming lodged between the spring coils and seats thereof, and this can be accomplished in several ways by associating with the helical spring a shield or cover which extends from the chassis construction to the spring lever, and which may be coincident in elongating and shortening movements with the corresponding movements of the spring when the vehicle is in use, and upon assembling of the mechanism. It will also be apparent that the corrugations shown as being formed in the wall of the cover construction illustrated in Figs. 1, 2, 3, 4, and 5 may have the walls thereof extending non-coincident to the helix angle of the spring. In fact, the corrugations, and particularly the small corrugations, are illustrated as being annularly normal to the center line of the spring. Hence, the small corrugations can touch the spring coils without becoming lodged therebetween, since the spring coils have a helical angle, non-coincident thereto.

It is to be understood that the cover elements in the combination can be formed out of any suitable weather-proof flexible material, other than rubber, without departing from the spirit of my invention.

I claim:

1. A vehicle spring casing comprising a molded rubber formation substantially cylindrical in form, with a flange formed about one end thereof, said casing having ribs comprising major and minor corrugations formed in the side wall whereby the casing may shorten and elongate when in use, without coming in contact with said spring.

2. A vehicle spring casing comprising a molded rubber formation substantially cylindrical in form and having annular corrugations, of major and minor corrugations whereby the casing may shorten and elongate when in use, without coming in contact with said spring and provided with means at one end thereof for seating attachment to the spring.

3. A vehicle spring cover, comprising a molded rubber formation, cylindrical in form and having annular corrugations of varying size disposed thereon, the corrugations nearest the center of the casing wall being substantially larger than those near the end of the casing wall.

4. A vehicle spring casing, comprising a molded rubber formation, cylindrical in form and having annular corrugations of varying size disposed thereon, the corrugations nearest the center of the casing being greater in outside diameter than those nearest the end of said casing, but the internal diameter of which are substantially uniform throughout the casing.

5. A vehicle spring casing comprising a generally hollow cylindrical form of flexible material, said form being extensible, wherein the extensibility of the form is greater at points remote from its ends than the extensibility of the form adjacent its ends.

6. A protective casing for a coiled vehicle spring comprising a substantially cylindrical casing having a series of circumferential corrugations, the corrugations adjacent the ends being normally spaced a shorter distance apart than the corrugations midway between the ends.

7. A protective casing for a coiled spring comprising a tubular casing of flexible material, having a series of corrugations, other series of corrugations at each end of the first-named series corrugations, the corrugations of said last-named series being spaced closer together than the corrugations of the first-named series and/or of less depth than the corrugations of the first-named series.

8. A vehicle spring comprising a hollow elongated form adapted to encircle a coil vehicle spring said form being extensible throughout substantially its entire length wherein portions of the extensible form are extensible to a greater degree than other portions of the extensible area of the form.

9. A vehicle spring casing for a vehicular coil spring comprising a tubular body of flexible material, said body provided with major circumferential corrugations acting to permit the expansion and contraction of the casing with the expansion and contraction of the spring and with substantially no internal stretching of the flexible material, and wherein said body is also provided with minor corrugations to permit vibratory movement of the body relative to the spring, whereby damage to the casing by the spring and interference with the action of the spring by the body are both substantially eliminated.

10. In a motor vehicle a coil spring interposed between two relatively angularly moving parts thereof, a casing comprising a tubular body of flexible material surrounding said spring and having its opposite ends secured respectively to said parts, said body provided with means acting to permit the expansion and contraction of the casing with the expansion and contraction of the spring and with substantially no internal stretching of the flexible material, and wherein said body is also provided with means to permit vibratory movement of the main portion of the body relative to the spring, whereby damage to the casing by the spring and interference with the action of the spring by the body are both substantially eliminated.

TOM H. THOMPSON.